United States Patent [19]

Sama

[11] 3,785,494
[45] Jan. 15, 1974

[54] FILTERING DEVICE

[76] Inventor: Nicholas Sama, 4940 S. W. 95th Ave., Miami, Fla. 33165

[22] Filed: Mar. 30, 1973

[21] Appl. No.: 346,574

Related U.S. Application Data

[63] Continuation-in-part of Ser. No. 240,491, April 3, 1972, abandoned, Continuation-in-part of Ser. No. 28,730, April 15, 1970, abandoned, Continuation of Ser. No. 665,817, Sept. 6, 1967, abandoned.

[52] U.S. Cl.................. 210/169, 210/459, 210/510
[51] Int. Cl.............................................. E04h 3/20
[58] Field of Search............... 210/169, 457 X, 194, 210/196, 459, 510

[56] References Cited
UNITED STATES PATENTS

| | | | |
|---|---|---|---|
| 3,301,402 | 1/1967 | Lalkenbey et al. | 210/169 |
| 2,786,026 | 3/1957 | Stark | 210/169 |
| 3,572,390 | 3/1971 | McMichael | 210/457 X |

Primary Examiner—Samih N. Zaharna
Assistant Examiner—T. A. Granger
Attorney—Paul M. Pahules

[57] ABSTRACT

An improved and compact filtering device especially adapted for use in aquariums which includes a tubular chimney of porous material having an internal column or bore which column constitutes a lift tube pumping means for the filter. Means are provided for introducing a stream of air bubbles into the bottom of the chimney column or lift tube to flow therethrough and to cause water to be drawn through the porous walls of the chimney from the aquarium for filtering, the water passing directly from the filtering medium into the lift tube column or pumping means, to exit therefrom through an unobstructed and free unreduced opening at the top of the chimney column or bore. The bottom of the chimney is preferably provided with means to constrain the flow of liquid through the filtering medium; and means connected to the chimney are provided to hold the device in a submerged vertical attitude.

9 Claims, 3 Drawing Figures

PATENTED JAN 15 1974

3,785,494

FILTERING DEVICE

This application is a continuation of U.S. Pat. application Ser. No. 665,817 filed Sept. 6, 1967, now abandoned, is a continuation-in-part of an earlier filed continuation application Ser. No. 28,730, filed Apr. 15, 1970 now abandoned, and is a continuation-in-part of a continuation-in-part application, Ser. No. 240,491, filed Apr. 3, 1972, and now abandoned.

This invention relates to an improved filtering device especially useful in aquariums; and, more particularly to an improved and compact filtering device which includes a dual-functioning-element in the form of a chimney or tube of porous material which 1) defines a lift-tube-pumping means and 2) a filtering medium.

In the past, contrary to the dual-functioning-element of the present invention, it has been known to provide filters which include three major and distinct components, namely, 1) a pumping means utilizing a column of rising bubbles from a source, commonly known as a lift tube, 2) a seperate filter element, and, 3) some type of conduit means connecting the filtering element and the pumping means. The present invention does not follow this structural pattern. As will be explained more fully hereinafter, the pumping means, filter element and connecting conduit means are one, single unit or intity.

The present invention provides a simple unitary structure with effective filtration flows passing from the filtering medium directly into the lift-tube-pumping means. Also, this invention provides for maximized pumping action by utilizing the overall heighthof the filter in the three-fold manner described above. Further, the reduction in the number of parts or structure required provides a more compact filter, which is more easily cleaned, is less expensive to manufacture, and is more adaptable for use in aquariums.

Representative of the prior art devices is that found in U.S. Pat. No. 3,301,402. In that patent, water to be filtered passes in series, first, through a filtering medium, thereafter, through a connecting member, and finally, into a seperate lift tube, which is the pumping means. Instead of the heretofore known three seperate stages through which the filtered water must go, in the present invention, the filtering action and pumping action takes place in the same means, the chimney; and the full height of the chimney is utilized to maximize the pumping action and also, the filtering action, the latter taking place on flow through the chimney wall directly into the chimney column or lift tube. In short, the chimney defines the filtering medium as well as the lift-tube column, with filtration flows directly from the former into the latter so that the seperate connecting structural element is eliminated.

It is thus seen that in this invention, the requirements for the pumping and filtering are all found in one entity with no extraneous elements being required, or increase in overall height beyond that of the chimney proper, the two functions, pumping and filtering, taking place by reason of the disclosed structure in generally co-cylindrical relation.

Since the amount of pumping action and, consequently, the filtering power of the unit, all other pertinent being equal, is dependent upon the height of the lift tube or chimney column below the water level, the present invention provides the advantage that, for a given depth of water, practically the entire depth dimension can be utilized therefor. The maximum flows resulting therefrom have the advantage of greatly reducing sweep-up times of debris and biological matter in the aquarium which would otherwise accumulate.

It is seen, therefore, that an object of this invention is to provide an improved compact filter aquarium device with high filtering power and pumping action which includes a porous chimney member through the walls of which liquid to be filtered is pumped by a lift tube means of maximum height which is defined by the filtering medium. In other words, the lift tube is surrounded by the filtering medium which is sized so as to be completely submerged, providing a compact structure with maximized flow because of the increased lift tube pumping action for the overall height of the unit. As an additional advantage, it is an object of this invention to provide a filtering unit having a chimney structure which may be removed from the device for cleaning purposes by simply cyclically flexing the same in a stream of flowing water and replacing it after it has been cleaned.

It is another object of this invention to provide an improved base for the chimney which resists clogging by jelly-like substances tending to form upon prolonged use in a poorly lighted environment for the aquarium.

It has been found that as the thickness of the chimney wall is increased, so is the filtering ability of the unit; however, increasing the wall thickness increases the resistance to the flow and, consequently, the requirement of additional pumping action. Also, the effectiveness of the pumping action of the lift-tube-pumping means is dependent on the relationship of bore diameter to the height thereof, favorable dimensions have been found for the chimney wall thickness to be ½ inch with the column or bore being one-half inch in diameter, and the height of the tube being about 7 to 8 inches. Air may be introduced into the device through a flow path of about ⅛ inch diameter, which part may be expanded at the exit portion, as is explained hereinafter, to prevent the accumulation of any blocking gel, which sometimes forms in an inadequately lighted aquarium. Preferably, the chimney material, which should be such as to retain its shape under the pressure differential produced by the lift tube, is polyurethane foam material.

In accordance with these and other objects which will become apparent hereinafter, this invention will now be described with reference to the accompanying drawings in which.

Figure 1:
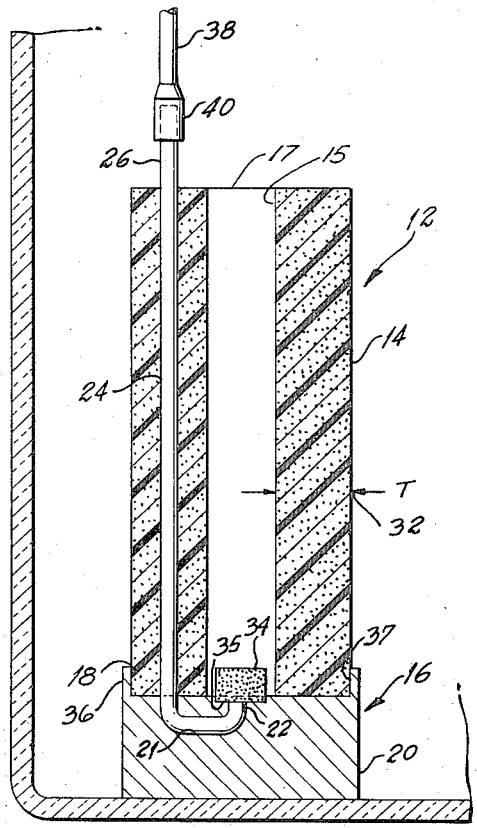
FIG. 1 is a cross sectional view of the filtering device of the instant invention.

Before referring in detail to the drawings, it will be helpful to consider that the filtering device includes a filtering means or filtering medium with a bore defining a lift tube type liquid pumping means. The liquid pumping means is not to be confused with a mechanical pumping appatatus, not shown in the drawing, but which is used with the filtering device to provide a prime motive power: the mechanical pump which provides a stream of air bubbles is not shown since it does not constitute a part of this invention. The pumping means referred to in the specifications is the liquid pumping means and is that structure which causes the liquid being filtered to be drawn through the filter medium into the column of the chimney, when it operates submerged in a tank. In the present invention, the liquid pumping means or lift tube is defined by the column or bore of the chimney of porous material, with an unrestricted, open upper end which provides for unimpeded flow therethrough. The column of the chimney is preferably closed at the bottom to constrain liquid to flow paths through the walls of the chimney.

Referring now to the drawings, wherein like reference characters designate like or corresponding parts throughout the different views, and referring particularly to FIG. 1, the numeral 12 generally designates the filtering device and which includes a tubular chimney 14, preferably of open-cell, porous material, such as polyurethane foam, having a bore or column 15, with an unrestricted open upper free end 17. The inside diameter of the chimney column or bore 15, is preferably in the order of approximately one-half an inch while the outside diameter is preferably in the order of approximately 1½ inches. The overall height of the chimney is preferably seven to eight inches. The dimensions given above represent approximations to the optimizing dimensions as obtainable by application of principles of fluid dynamics. There is, therefore, a definite relationship between the diameter and the height of the chimney column or tube, and for every size of chimney there is a set of vales which will produce satisfactory operating results. Chimney 14 and bore 15 being of equal height.

A lower cap assembly 16 is provided in covering relation of the lower end 18 of the chimney. This cap assembly in the preferred embodiment includes a weighted portion 20 with a U-shaped passageway 21 and a mouth or outlet 22 to permit a flow of air into the chimney at the bottom thereof. With further reference to FIG. 1, it will be seen that, in the preferred embodiment, a longitudinally extending through bore 24 is provided in the side wall of the chimney 14 to accommodate an inflow tube 26, preferably of semi-rigid neutral plastic material, and having an inside diameter of about one-eighth inch, which is snugly, but not tightly received in the bore 24. This tube 26 extends substantially to the bottom of the chimney and is connected by suitable means to the cap assembly. The tube 26 is adapted to introduce air to the lower end of the chimney through the aforesaid passageway 21 and mouth 22, constituting an access means.

Air, when introduced into the bottom of the bore 15 of the chimney, will flow upwardly producing a pumping action and causing water to be drawn through the thickness T of the side wall, as indicated at 32 at all elevations thereof. The water and air mixture flows thereafter upwardly to exit unrestrictedly from the open upper free end 17 of the chimney bore 15. The unrestricted upper free end 17 of the bore 15 is the controlling factor of the pumping action of the device in producing the greatest pumping action consistent with optimizing conditions herein. In order to secure better distribution of the air bubbles within the cross sectional area of the chimney column or bore 15, a porous stone 34 may be provided and seated in a counter bore 35 or suitably fixed to the top of the weighted portion 20, so that the air is constrained to a path leading through the porous stone to effect the same action as heretofore described but with a more evenly and widely dispersed distribution of the air bubbles, that is, over an enlarged cross sectional area in the bore 15. The chimney 14 may easily be removed from an annular orienting means or seal ring 36, extending upwardly from the cap periphery about the seat 37 then up and off the tube 26 after the length of flexible hose or tube 38 has been removed from the terminal end 40 of the upstanding tube 26. Thereafter, the chimney may be cleaned by cyclically flexing the same as by squeezing it under or in a running stream of water.

In use, for maximum filtering action, the air should be introduced at about the bottom of the chimney bore 15, since it is the height of the lift tube from the point of introduction of the air which is the principal factor in tha amount of pumping action achieved. This is unlike the structure of the prior art devices, such as that of the U.S. Pat. No. 3,301,402, in which the location of the air inlet depthwise in the bore in the filtering medium is without significant effect on the pumping action, because in that device, the lift tube is a seperate structural element connected by a highly restricted conduit to the filtering medium. If the upper free end of the bore 15 of the chimney 14 were to be substantially restricted, then, as in U.S. Pat. No. 3,301,402, to the degree that it is restricted, there would be a reduction of the pumping action.

It is thus seen that there has been provided and improved filter which has a decreased sweep-up time, that is the time required to remove dirt particles in the aquarium proper. As a result of the increased flow of the filtering device of the present invention, the effective sweep-up time of the filter in an aquarium medium is reduced and heavy layers of crusted dirt an biological debris do not form, which would require removal by other means or else the aquarium would become uninhabitable for aquarium life. It has been found that the flow through the filtering medium by reason of the structure of the disclosure contained herein is in the order of eight to ten times as great as is obtainable from the comparable structure of that of U.S. Pat. No. 3,301,402.

Figure 3:
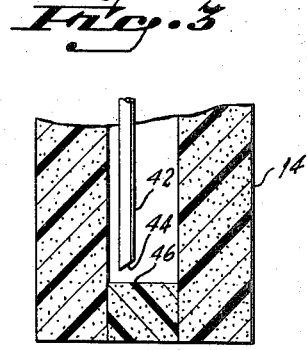
FIG. 3 is a partial cross sectional view of an alternative embodiment of the filtering device of the instant invention.

In the embodiment shown in FIG. 3, the lower end of the tube 42 is beveled, as at 44, so that it can rest on the bottom of the chimney without blocking the inlet, and which bottom, in the embodiment shown is porous as at 46.

Figure 2:
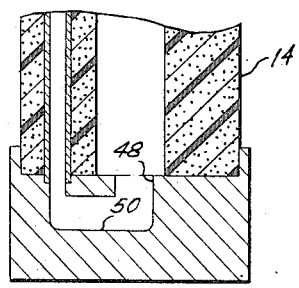
FIG. 2 is a partial cross sectional view of a modification of the filtering device of the instant invention.

While no problem of accumulation of jelly-like material would occur at the end 44 of the air inlet tube 42 in the embodiment of FIG. 3, it can occur, especially in a poorly lighted aquarium, in the structure of the embodiment of FIG. 1. Such accumulation tends to block the passageway 21. This jelly-like substance is easily removed by dipping the cap means in strong bleaching solution; however, to avoid the problem completely, the embodiment of FIG. 2 may be utilized in which it is seen that the mouth 48 and the underlying vertical and lateral portions of the passageway 50 communicating between the bore and the air-inlet means are of an enlarged cross sectional area. It has been found that if this cross sectional area is in the order of about one-quarter inch in diameter, there is no problem of accumulation of this matter.

The present invention has been described for purposes of illustration only and is not intended to be limited by this description or otherwise except as defined in these appended claims.

What is claimed is:

1. A filter assembly for continuously filtering aquarium water comprising:

a lower cap assembly including a weighted portion having an upper and lower surface portion, said weighted portion including peripheral orienting means projecting above said upper surface portion, said weighted portion including an air-outlet mouth opening from said upper surface portion of said cap assembly, said weighted portion including an air inlet tube integrally connected to said weighted portion and projecting vertically from the upper surface portion and terminating in an upper free end for connection to a fluid-pressure source, said weighted portion including an internal passageway below the upper surface and connecting said air inlet tube to said air-outlet mouth whereby air introduced under pressure into said air-inlet tube will forcibly rise from the upper surface of said weighted portion; and a one-piece, integrally-molded, filter chimney having a lower end portion removably seated generally conforming to the upper surface of said weighted portion and oriented on said weighted portion as its outer surface by said peripheral orienting means, said chimney including a through chimney column having a generally uniform cross section, said chimney column being in axial alignment with said air outlet mouth and at least surrounding the same whereby air freely moves into said chimney, said filter chimney having a through bore extending the length thereof and parallel to said chimney column and being substantially complementary in cross section to said air-inlet tube and removably receiving the same therethrough to co-operate with said peripheral orienting means to position said filter chimney in an operative position on the upper surface of said cap assembly weighted portion, said filter chimney comprising an open-celled, flexible, deformable, washable material of the class of polyurethane foam.

2. The structure as claimed in claim 1 in which said peripheral orienting means comprises a peripheral flange extending vertically from and surrounding the upper surface of said weighted portion.

3. The structure as claimed in claim 1 in which said air-inlet tube is J-shaped and includes a lower portion defining said internal passageway, and a branch portion communicating with said outlet, said lower portion of said J-shaped tube being embedded in said weighted portion.

4. The structure as claimed in claim 1 in which said lower cap assembly and filter chimney are cylindrical.

5. The structure as claimed in claim 1 including a porous element seated on said weighted portion and overlying said air-outlet mouth.

6. The structure as claimed in claim 1 wherein said internal passageway includes a vertical portion extending depthwise from the air-inlet mouth and a lateral portion to the center line of the air-inlet tube, and the cross sectional area of the vertical and lateral portion are of a diameter greater than one-eighth inch to resist accumulation of substances in said portion tending to block the flow of gas therethrough.

7. For use in an aquarium, filled to a depth with liquid, a filter comprising:

A tubular chimney of porous material having a bore constituting a lift tube pumping means, the wall of said chimney being of an open-celled washable material of the class of plastic foams and defining a filtering medium and flow paths for the liquid being filtered into the lift tube pumping means, said filtering medium and said lift tube pumping means being substantially coaxial and of equal height, said filtering medium occupying the space surrounding and defining the lift tube pumping means, said chimney being adapted to be submerged in the aquarium liquid depth with the bore in generally vertical alignment; access means at the bottom of the chimney to introduce air into the bore of the chimney to cause a pumping action, and an air tube communicating with said access means to deliver air thereto means to main-tain said access means at the bottom of said chimney bore said chimney bore providing for substantially unrestricted upward movement of air and water therein, the water being drawn through and filtered by the porous chimney wall when air is introduced into said chimney bore, said chimney having a substantially unrestricted upper free discharge end providing substantially unrestricted flow therethrough, means at the chimney bottom constraining flow of liquid to be filtered to flow through the porous material, orienting means to orient and maintain said chimney in the aquarium in a stable position, and means to connect the orienting means to said chimney.

8. The device as set forth in claim 7 wherein said chimney is provided with a straight, longitudinally extending, bore in the side wall thereof, a straight tube is nested in said bore, said tube communicating with said access means for introducing air into said chimney bore, and said tube connecting said chimney to said orienting means.

9. The device as set forth in claim 7 wherein said access means includes a porous stone to distribute air bubbles over the cross sectional area of said chimney bore.

* * * * *